(12) United States Patent
Eick et al.

(10) Patent No.: US 10,114,132 B2
(45) Date of Patent: Oct. 30, 2018

(54) OPTIMAL PHASE RELATIONSHIP

(71) Applicant: CONOCOPHILLIPS COMPANY, Houston, TX (US)

(72) Inventors: Peter M. Eick, Houston, TX (US); Joel D. Brewer, Houston, TX (US); Stephen K. Chiu, Katy, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 282 days.

(21) Appl. No.: 15/019,555

(22) Filed: Feb. 9, 2016

(65) Prior Publication Data

US 2016/0231442 A1    Aug. 11, 2016

Related U.S. Application Data

(60) Provisional application No. 62/114,289, filed on Feb. 10, 2015.

(51) Int. Cl.
*G01V 1/00* (2006.01)

(52) U.S. Cl.
CPC ........ *G01V 1/005* (2013.01); *G01V 2210/127* (2013.01)

(58) Field of Classification Search
CPC ..................................................... G01V 1/005
See application file for complete search history.

(56) References Cited

U.S. PATENT DOCUMENTS

| | | | |
|---|---|---|---|
| 7,295,490 B1 | 11/2007 | Chiu et al. | |
| 7,864,630 B2 | 1/2011 | Chiu et al. | |
| 8,467,267 B2 | 6/2013 | Eick et al. | |
| 2008/0205193 A1 | 8/2008 | Krohn et al. | |
| 2009/0116337 A1* | 5/2009 | Chiu | G01V 1/005 367/41 |
| 2010/0208554 A1 | 8/2010 | Chiu et al. | |
| 2011/0128818 A1 | 6/2011 | Eick et al. | |
| 2014/0169128 A1 | 6/2014 | Orban et al. | |

OTHER PUBLICATIONS

Chiu, Stephen K., et al—"High Fidelity Vibratory Seismic (HFVS): Optimal Phase Encoding Selection", 2005, SEG/Houston Annual Meeting, pp. 37-40; 4 pgs.
International Search Report dated Nov. 15, 2016 for PCT/US2016/017144; 4 pgs.

* cited by examiner

*Primary Examiner* — Hovhannes Baghdasaryan
(74) *Attorney, Agent, or Firm* — Conocophillips Company

(57) ABSTRACT

Improved methods of gather high fidelity vibratory seismic surveys for ZenSeis® systems wherein at least one optimal phase encoding schemes for surveys having 2-8 vibratory sources are disclosed. These encoding schemes can be hard coded into the source controller and will allow for quality data to be obtained on each survey. Further, the data will also have the best separation during inversion processing steps, leading to an optimal seismic survey.

8 Claims, 8 Drawing Sheets

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |
| 3 | 304 | 194 | 277 | 343 | 27 |
| 4 | 27 | 304 | 194 | 277 | 343 |
| 5 | 343 | 27 | 304 | 194 | 277 |

| sweep | vib1 | vib2 |
|---|---|---|
| 1 | 100 | 3 |
| 2 | 3 | 100 |

FIGURE 4

| sweep | vib1 | vib2 | vib3 |
|---|---|---|---|
| 1 | 148 | 194 | 29 |
| 2 | 194 | 148 | 194 |
| 3 | 29 | 194 | 148 |

FIGURE 5A

| sweep | vib1 | vib2 | vib3 | vib4 |
|---|---|---|---|---|
| 1 | 180 | 81 | 60 | 353 |
| 2 | 81 | 180 | 353 | 60 |
| 3 | 60 | 353 | 180 | 81 |
| 4 | 353 | 60 | 81 | 180 |

FIGURE 5B

| sweep | vib1 | vib2 | vib3 | vib4 |
|---|---|---|---|---|
| 1 | 137 | 294 | 238 | 245 |
| 2 | 347 | 9 | 65 | 252 |
| 3 | 274 | 200 | 295 | 27 |
| 4 | 38 | 144 | 239 | 151 |
| 5 | 356 | 290 | 103 | 17 |
| 6 | 232 | 346 | 159 | 253 |

FIGURE 6A

| sweep | vib1 | vib2 | vib3 | vib4 | vib5 |
|---|---|---|---|---|---|
| 1 | 204 | 301 | 319 | 55 | 38 |
| 2 | 301 | 204 | 38 | 319 | 55 |
| 3 | 319 | 38 | 204 | 38 | 319 |
| 4 | 55 | 319 | 38 | 204 | 301 |
| 5 | 38 | 55 | 319 | 301 | 204 |

FIGURE 6B

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |
| 3 | 304 | 194 | 277 | 343 | 27 |
| 4 | 27 | 304 | 194 | 277 | 343 |
| 5 | 343 | 27 | 304 | 194 | 277 |

FIGURE 7A

| sweep | vib1 | vib2 | vib3 | vib4 | vib5 | vib6 |
|---|---|---|---|---|---|---|
| 1 | 16 | 53 | 266 | 94 | 285 | 321 |
| 2 | 53 | 16 | 321 | 266 | 94 | 285 |
| 3 | 266 | 321 | 16 | 285 | 266 | 94 |
| 4 | 94 | 266 | 285 | 16 | 321 | 266 |
| 5 | 285 | 94 | 266 | 321 | 16 | 53 |
| 6 | 321 | 285 | 94 | 266 | 53 | 16 |

FIGURE 7B

| sweep | vib1 | vib2 | vib3 | vib4 | vib5 | vib6 |
|---|---|---|---|---|---|---|
| 1 | 352 | 277 | 322 | 155 | 61 | 302 |
| 2 | 302 | 352 | 277 | 322 | 155 | 61 |
| 3 | 61 | 302 | 352 | 277 | 322 | 155 |
| 4 | 155 | 61 | 302 | 352 | 277 | 322 |
| 5 | 322 | 155 | 61 | 302 | 352 | 277 |
| 6 | 277 | 322 | 155 | 61 | 302 | 352 |

FIGURE 8A

| sweep | vib1 | vib2 | vib3 | vib4 | vib5 | vib6 | vib7 |
|---|---|---|---|---|---|---|---|
| 1 | 85 | 210 | 138 | 162 | 309 | 287 | 176 |
| 2 | 210 | 85 | 176 | 138 | 162 | 309 | 287 |
| 3 | 138 | 176 | 85 | 287 | 309 | 162 | 309 |
| 4 | 162 | 138 | 287 | 85 | 287 | 138 | 162 |
| 5 | 309 | 162 | 309 | 287 | 85 | 176 | 138 |
| 6 | 287 | 309 | 162 | 138 | 176 | 85 | 210 |
| 7 | 176 | 287 | 309 | 162 | 138 | 210 | 85 |

FIGURE 8B

| sweep | vib1 | vib2 | vib3 | vib4 | vib5 | vib6 | vib7 |
|---|---|---|---|---|---|---|---|
| 1 | 159 | 45 | 196 | 225 | 309 | 249 | 80 |
| 2 | 80 | 159 | 45 | 196 | 225 | 309 | 249 |
| 3 | 249 | 80 | 159 | 45 | 196 | 225 | 309 |
| 4 | 309 | 249 | 80 | 159 | 45 | 196 | 225 |
| 5 | 225 | 309 | 249 | 80 | 159 | 45 | 196 |
| 6 | 196 | 225 | 309 | 249 | 80 | 159 | 45 |
| 7 | 45 | 196 | 225 | 309 | 249 | 80 | 159 |

FIGURE 9A

| sweep | vib1 | vib2 | vib3 | vib4 | vib5 | vib6 | vib7 | vib8 |
|---|---|---|---|---|---|---|---|---|
| 1 | 331 | 327 | 101 | 55 | 207 | 67 | 259 | 3 |
| 2 | 327 | 331 | 3 | 101 | 55 | 207 | 67 | 259 |
| 3 | 101 | 3 | 331 | 259 | 67 | 55 | 207 | 67 |
| 4 | 55 | 101 | 259 | 331 | 259 | 101 | 55 | 207 |
| 5 | 207 | 55 | 67 | 259 | 331 | 3 | 3 | 55 |
| 6 | 67 | 207 | 55 | 101 | 3 | 331 | 327 | 101 |
| 7 | 259 | 67 | 207 | 55 | 3 | 327 | 331 | 327 |
| 8 | 3 | 259 | 67 | 207 | 55 | 101 | 327 | 331 |

FIGURE 9B

| sweep | vib1 | vib2 | vib3 | vib4 | vib5 | vib6 | vib7 | vib8 |
|---|---|---|---|---|---|---|---|---|
| 1 | 298 | 122 | 193 | 138 | 247 | 180 | 93 | 78 |
| 2 | 78 | 298 | 122 | 193 | 138 | 247 | 180 | 93 |
| 3 | 93 | 78 | 298 | 122 | 193 | 138 | 247 | 180 |
| 4 | 180 | 93 | 78 | 298 | 122 | 193 | 138 | 247 |
| 5 | 247 | 180 | 93 | 78 | 298 | 122 | 193 | 138 |
| 6 | 138 | 247 | 180 | 93 | 78 | 298 | 122 | 193 |
| 7 | 193 | 138 | 247 | 180 | 93 | 78 | 298 | 122 |
| 8 | 122 | 193 | 138 | 247 | 180 | 93 | 78 | 298 |

OPTIMAL PHASE RELATIONSHIP

PRIOR RELATED APPLICATIONS

This application is a non-provisional application which claims benefit under 35 USC § 119(e) to U.S. Provisional Application Ser. No. 62/114,289 filed Feb. 10, 2015, entitled "Optimal Phase Relationship," which is incorporated herein in its entirety.

FIELD OF THE DISCLOSURE

The disclosure relates to seismic prospecting for hydrocarbon resources and especially to the acquisition of seismic data using multiple seismic source and receiver systems.

BACKGROUND OF THE DISCLOSURE

Seismic surveys image or map the subsurface of the earth by imparting acoustic energy into the ground and recording the reflected energy or "echoes" that return from the rock layers below. Each time the energy source is activated it generates a seismic signal that travels into the earth, is partially reflected, and, upon its return, may be recorded at many locations on the surface as a function of travel time.

In the process of acquiring seismic data, a crew is typically deployed across several square miles of a survey area positioning cables and seismic receivers while seismic sources move from predetermined point to predetermined point to deliver vibrational seismic energy into the earth. The receivers capture the reflected signals that are recorded and subsequently processed to develop images of geologic structures under the surface.

A land survey typically uses one of two energy sources to generate the down going seismic signal: either an explosive source or a vibrational source. Of particular interest for purposes of the instant disclosure is the use of seismic vibrator. A seismic vibrator generally takes the form of a truck or other vehicle that has a base plate that can be brought into contact with the earth. Conventionally, a reaction mass in association with a baseplate is driven by a system to produce vibratory motion, which travels downward into the earth via the base plate.

The receivers that are used to detect the returning seismic energy for the land survey usually take the form of sensors like geophones or accelerometers. The returning reflected seismic energy is acquired from a continuous signal representing displacement, velocity or acceleration that may be represented as an amplitude variation as a function of time.

Multiple source activation/recording combinations are subsequently combined to create a near continuous image of the subsurface. A survey produces a data volume that is an acoustic image of the subsurface that lies beneath the survey area.

A survey may be designed that uses multiple vibrators, conventionally each being activated simultaneously so that the receivers and recording instruments capture a composite signal with contributions from all of vibrators. The composite signal forms a separable source vibrator record that allows for source separation through data inversion.

One vibratory seismic data acquisition method for acquiring separable source vibrator records is known as high fidelity vibratory seismic (HFVS). The vibrator motion signal will be recorded during each sweep for each vibrator, and the uncorrelated receiver data will similarly be recorded and stored, with the intent of later using the recorded information to process the seismic data and to produce a subsurface image.

One of the requirements of HFVS is to encode a unique phase rotation into the vibrator sweep to ensure the separation of multi-vibrator gathers into a single source gather is feasible. HFVS is normally taken to use "orthogonal phase encoding" which involves the application of a constant 0, 90 or 180 degree phase shift to each vibrator's signal. That is, each vibrator generates an identical signal, but the phase of each is shifted by a predetermined amount with respect to the others. An inversion technique is then used to separate the contribution of each individual vibrator from the composite signal. The problem with HFVS is the orthogonal phase encodings tend to leak even harmonics through the inversion separation and then the subsequent summation step.

A better approach for simultaneous multi-vibe sourcing (SMS) technology is ZenSeis® which uses non-orthogonal optimized phase encoded approaches. ZenSeis® phase encoding maximize the stability of the separation and summation matrix and minimize the crosstalk between simultaneous source locations. ZenSeis® is a superset of HFVS that is the optimally selected phase encodings for simultaneous source acquisitions.

However, as promising as the ZenSeis® technology might be, satisfactory methods for choosing among the potentially infinite number of combinations of sweep phase angles have been lacking. There is a general feeling in the industry (the HFVS legacy) that the vibrators should produce signals that are orthogonal to each other but, even assuming that is a design goal, there are still a number of ways that criteria might be implemented with no clear-cut method for choosing between them to ensure that the source separation is as good as possible. Further, if the orthogonally requirement is relaxed and the phase angles of the sweeps are allowed to be non-orthogonal, there is also potentially an infinity of phase encoding schemes to choose from, which means that the problem of selecting the best phase shifts is far too complicated to approach manually.

Though efforts have been made to improve phase encoding schemes, there is still the fundamental problem that regardless of the phase encoding solution that is undertaken, the basic premise that the vibes actually output the signal that is desired into the earth via the baseplate exists. Extensive testing of this premise has shown that the vibes make a reasonable first order approximation to the desired sweep, they are not generally that accurate particularly at the ends of the sweeps.

Thus, there exists a need for further improvements in the area of phase encoding schemes for vibratory sources in the development of quality and efficient seismic surveys.

SUMMARY OF THE INVENTION

The present disclosure improves upon U.S. Pat. No. 7,295,490 by describing an optimal phase relationship for encoding of vibratory seismic sources and methods of use. U.S. Pat. No. 7,295,490 attempts to solve many of the problems associated with phase encoding by disclosing a method to determine the best phase encoding scheme to yield better quality ZenSeis® surveys by analyzing the Eigen values and condition numbers available for a given seismic survey. While this method allows for determining what the proper phase encoding is, it does not address the specific concept of what the optimal relationship is between the phase encoding. Thus, multiple trial and error attempts may be needed to achieve an encoding scheme that will produce an adequate separation.

The present disclosure has built upon the methods in U.S. Pat. No. 7,295,490 to determine that there exists an optimal phase relationship for encoding. While other encoding schemes may work for a particular vibratory seismic source setup, the presently disclosed encoding scheme is the optimal listing for each arrangement of vibratory sources. This will negate the need for pre-data acquisition steps of comparing proposed encoding scheme for synthetic data or determining survey parameters in advance to create a suitable encoding scheme. This results in decreased time needed to obtain seismic survey data.

The key benefits of the ZenSeis® system over similar ones such as conventional HFVS are improved data bandwidth, increased spatial resolution, and reduced acquisition cost. An exemplary ZenSeis® system is shown in FIG. 1. FIG. 1 shows four vibrators 18, 20, 22, and 24, mounted on vehicles 34, 36, 38, and 40. ZenSeis® sources include vibroseis, seismic vibrator, and combinations thereof. Other multiple source seismic surveys include high fidelity vibratory seismic (HFVS), cascaded HFVS, combined HFVS, slipsweep, and the like.

The four different signatures transmitted into the ground during sweep i may be called $S_{i1}$, $S_{i2}$, $S_{i3}$, $S_{i4}$. Each signature is convolved with a different earth reflectivity sequence $e_1$, $e_2$, $e_3$, $e_4$, which includes reflections 26 from the interface 28 between earth layers having different impedances (the product of the density of the medium and the velocity of propagation of acoustic waves in the medium). A trace $d_i$ recorded at a geophone 30 is a sum of the signature-filtered earth reflectivities for each vibrator. Mathematically, the data trace $d_i(t)$ for this sweep is:

$$d_i(t) = \Sigma_{j=1}^{N} g_{ij}(t) \otimes e_j(t) \quad \text{Equation 1:}$$

where $g_{ij}(t)$=sweep i from vibrator j, $e_j(t)$=earth reflectivity seen by vibrator j and {circle around (×)} denotes the convolution operator.

There are four vibrators in FIG. 1 and at least the same number of sweeps, so matrix $d_i(t)$ would have k columns and several thousand rows, the length of each row depending on the length of time recorded and the sample rate. The number of sweeps should be equal two or greater than the number vibrators so as to collect excess data to form an over determined system. Also, $g_{ij}(t)$ will be dependent on the phase encoding scheme. This is the matrix that was of interest in U.S. Pat. No. 7,295,490 for determining the best phase encoding.

The present method follows the acquisition methods in U.S. Pat. No. 7,295,490, but replaces the trial and error approach to finding a suitable encoding scheme with specific, optimal phase encoding schemes for 2-8 vibrators ZenSeis® systems that were previously determined as described above. Once the optimal phase encoding relationships are determined they can be used over and over again in a lookup type table.

FIG. 2 illustrates the steps taken in U.S. Pat. No. 7,295, 490. A seismic survey is planned according to methods well known to those of ordinary skill in the art (step 205). As part of the planning, the coverage area will be typically selected and various acquisition parameters will be specified. Among the acquisition parameters that might be specified at this stage include shot and receiver line and station spacing, number of recording channels, near/far receiver offsets, sample rate, etc. Additionally, and in connection with the instant disclosure, if the survey is to be a ZenSeis® survey, the number of vibrators, the number of repetitions at each shot point, and the phase differentials might be determined based on industry rules of thumb as taught by U.S. Pat. No. 7,295,490 (step 230).

The seismic data is then collected in the field (item 210) over a subsurface target of potential economic importance. The data might be collected over land, water, or any combination of these environments. In any case, it is always an object to collect the highest quality raw data (i.e., unprocessed seismic trace data) as is possible, as that can only make the subsequent job of processing and interpretation easier. In most cases the data will be stored locally as it is collected using, by way of example only, magnetic tape, magnetic disk, CD-R, DVD-R, or other mass storage medium.

In some cases, limited processing of the collected seismic data might be done in the field. This might be done for quality control purposes, for example. In U.S. Pat. No. 7,295,490, actual field records can be in-field processed to ensure that the selected the phase encoding scheme(s) produce the highest quality data (step 230).

The collected seismic data 210 (with or without in-field preprocessing) are typically next sent to a data processing center 250 where a variety of seismic data processing algorithms 220 are applied to the seismic traces to make them more amenable to interpretation. The processed traces would then typically be stored, by way of example only, on hard disk, magnetic tape, magneto-optical disk, DVD disk, or other mass storage means, until they are needed by an interpreter.

The methods disclosed herein would best be implemented in the form of a computer program 230 that has been loaded onto a general purpose programmable computer 250 where it is accessible by a seismic interpreter or processor. A general purpose computer 250 includes, in addition to mainframes, workstations and personal computers, computers that provide for parallel and massively parallel computations, wherein the computational load is distributed between two or more processors.

The present disclosure improves upon FIG. 2 by removing step 230. The optimal phase encodings disclosed in the present invention will be used, thus negating the need to test the encodings on synthetic data or perform in-field processing to determine the quality of the collected data. This will decrease the pre-acquisition steps and time needed to collect survey data.

This summary is provided to introduce a selection of concepts that are further described below in the detailed description. This summary is not intended to identify key or essential features of the claimed subject matter, nor is it intended to be used as an aid in limiting the scope of the claimed subject matter.

As used herein, "phase encoding" means the application of a constant phase shift to each vibratory signal.

As used herein, "sweeps" refers to a period of time that the vibrator is actuated and energy is imparted into the earth over a set of frequencies.

"Simultaneous" sweeps are conducted by two or more seismic sources during overlapping periods of time.

"ZenSeis®" as used herein refers to an optimally selected non-orthogonal phase encoded simultaneous sourcing technique for seismic acquisitions using multiple sources based on Monte Carlo simulation. This differs from a normal HFVS system, which uses orthogonal phase encodings.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| HFVS | high fidelity vibratory seismic - orthogonal phased simultaneous sourcing technique |
| ZenSeis ® | Optimally selected non-orthogonal phased simultaneous sourcing technique |
| SMS | Simultaneous multi-vibe sourcing |
| Vib | Vibrator |

BRIEF DESCRIPTION OF THE DRAWINGS

FIG. 3. Optimal phase encoding for 2 vibrators in a ZenSeis® system. Phase angle is in degrees.

FIG. 4. Optimal phase encoding for 3 vibrators in a ZenSeis® system. Phase angle is in degrees.

FIG. 5A-B. Optimal symmetric phase encoding for 4 vibrators in a ZenSeis® system (5A) and an alternative non-symmetric encoding (5B) for noisy conditions where extra sweeps are necessary for random noise processing. Phase angle is in degrees.

FIG. 6A-B. Optimal symmetric phase encoding for 5 vibrators in a ZenSeis® system (6A) and an alternative non-symmetric encoding (6B). Phase angle is in degrees. Note that 38 degrees is intentionally used twice in FIG. 6A.

FIG. 7A-B. Optimal symmetric phase encoding for 6 vibrators in a ZenSeis® system (7A) and an alternative non-symmetric encoding (7B). Phase angle is in degrees. Note that 266 degrees is intentionally used twice in FIG. 7A.

FIG. 8A-B. Optimal symmetric phase encoding for 7 vibrators in a ZenSeis® system (8A) and an alternative non-symmetric encoding (8B). Phase angle is in degrees.

FIG. 9A-B. Optimal symmetric phase encoding for 8 vibrators in a ZenSeis® system (9A) and an alternative non-symmetric encoding (9B). Phase angle is in degrees.

DESCRIPTION OF EMBODIMENTS OF THE DISCLOSURE

Figure 1:
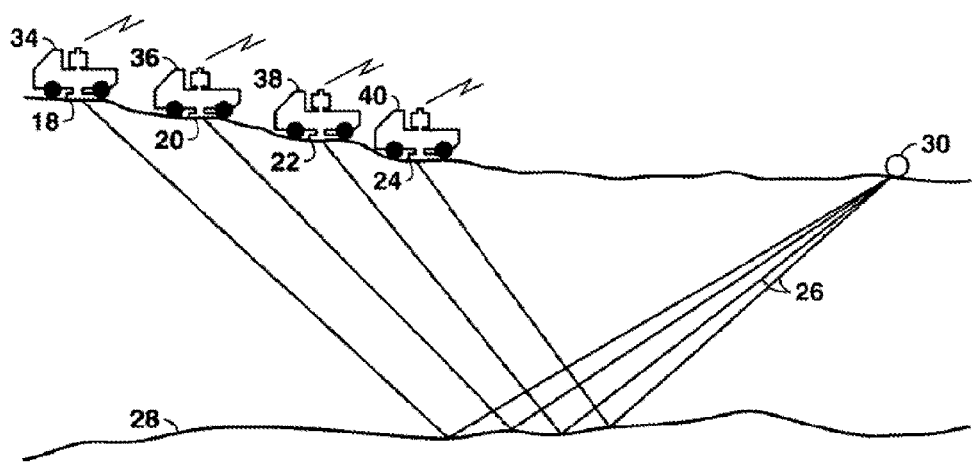
FIG. 1. Prior Art example of ZenSeis® system from U.S. Pat. No. 7,295,490.

The disclosure provides a novel optimal phase relationship for encoding of vibratory seismic sources for multi-source inversion and separation and methods of use. This optimal listing for up to 8 sources and alternatives is described and will work for each arrangement of sources. Additionally, for systems utilizing 4 or more vibratory sources, an alternative encoding for noisy conditions is also provided.

The fidelity of source separation of the phased simultaneous multi-vibe sourcing acquisition depends on the design on the vibratory phase encoding scheme. A good phase encoding scheme design leads to better source separation, which, in turn, leads to better data quality. ZenSeis® represents the optimally selected phase encodings that produce the better separation during the inversion process. ZenSeis® is a sub-set of HFVS systems and uses non-orthogonal phase encodings.

U.S. Pat. No. 7,295,490 provided a method for determining a good or optimal phase encoding scheme for ZenSeis® acquisition wherein the condition number is established for a particular matrix and the separation of the eigenvalues for that matrix are calculated to evaluate a proposed ZenSeis® survey design. However, before data acquisition and/or synthetic data generation can occur, many steps must be taken to create a proposed encoding scheme to be tested. This can require a user to determine, beforehand, survey acquisition parameters such as number of vibrators, sweep function, and number of sweeps. These parameters can then be used to determine the geometry of the ZenSeis® scheme and the proposed encoding scheme with selected phase angle shifts for each vibrator for each sweep. Alternatively, a user can simply chose phase angle shifts, collect or generate data, and then visibly compare the seismic survey to determine if different phase angles should be chosen.

The presently disclosed methods improve upon U.S. Pat. No. 7,295,490 by removing this pre-acquisition step. Described herein are optimal phase encoding schemes for use with up to 8 vibrators in a ZenSeis® system. While the technique is capable of working with more than 8 vibrators at once, practical field experience has shown that an efficiency limit occurs at around 8 sweeps with 8 vibes. Errors like vibes not being in the correct spot or leaving too early seem to occur with much more than 8 sweeps, which sets a practical, although not theoretic limit. The schemes described herein are based on the application and refinement of U.S. Pat. No. 7,295,4490 and can be hard coded into the vibe controller or recording system as the optimal phase encodings for the different cases. Essentially we minimized the condition of the matrix so they are the mathematically the best and are documenting the optimal phase encoding relationships for phase encoded systems in these cases for hard coding into a system.

The present disclosure includes any of the following embodiments in any combination(s) of one or more thereof:

Optimal phase encoding schemes of FIGS. 3-9 for a ZenSeis® phase encoded high production simultaneous sourcing method having two to eight sources. These schemes both minimize the condition of the matrix and provides the optimal separation and summation of the composite data.

Optimal phase encoding schemes for a ZenSeis® phase encoded high production simultaneous sourcing method having two to eight sources and a matching number of sweeps comprising the schemes found in FIGS. 3, 4, 5A, 6A-B, 7A-B, 8A-B, and 9A-B.

A method of acquiring optimal seismic survey data using a ZenSeis® wherein the number of vibratory sources in the ZenSeis® survey and number of vibration sweeps are determined, a corresponding phase encoding scheme in FIG. 3-9 for said number of vibratory sources and vibration sweeps is chosen, positioning the vibrators proximate to a predetermined location on the surface of the earth, energizing the vibrators according to the selected phase encoding scheme thereby vibrating the earth to produce a seismic signal, acquiring the reflected seismic signal data at one or more receivers, and processing the data to create a seismic survey.

A method of calculating the optimal phase encoding scheme for a ZenSeis® having 2-8 vibrators, by first preselecting a number of sweeps, wherein the number of sweeps is at least equal to the number of vibrators; calculating the optimal phase shifts using a Monte Carlo simulation to find the lowest matrix condition number, distinctive singular values, and minimum separation between singular values for a given vibrator-sweep matrix; positioning the vibrators proximate to a predetermined location on the surface of the earth; energizing the vibrators according to the phase encoding scheme thereby vibrating the earth to produce a seismic signal; acquiring the reflected seismic signal data at one or more receivers; and, processing the data to create a seismic survey.

Any of the above methods wherein the number of vibration sweeps is equal to the number of vibrators.

Any of the above methods, wherein the number of vibration sweeps is greater than the number of vibrators.

The optimal symmetric encoding schemes and/or alternate non-symmetric schemes are displayed in FIGS. 3-9 for ZenSeis® systems having 2 to 8 vibrators based upon the concepts of minimizing the condition number of the inversion matrix, distinctive singular values and minimizing separation between singular values.

To determine the optimal phase-code scheme for the field operation in the present invention, we simulated a phase-encoding vibroseis sweep in the field, using a typical vibroseis sweep generator shown in Equation 2, wherein the amplitude of A(t) is constant with time except for a tapering at the beginning and end of the sweep and $\phi$ is a constant phase rotation.

$$SW(t)=A(t)\cos(2\pi\alpha(t)+\phi) \quad \text{Equation 2:}$$

The function $\alpha(t)$ describes the rate of frequency change in linear sweep and is defined by Equation 3, where $f_o$ and $f_1$ are the lower and upper frequency limits of the sweeps and T is the sweep length.

$$\alpha(t)=f_0 t+(f_1-f_0)t^2/(2T) \quad \text{Equation 3:}$$

The multi-sweep and multi-vibrator gathers can be generated by convolving the synthetic sweep that has a unique phase rotation with a reflectivity model. The data trace for sweep i is then Equation 1 above.

In the frequency domain, Equation 1 in matrix notation becomes:

$$D(f)=G(f)E(f) \quad \text{Equation 4:}$$

Using the singular value decomposition (Aki and Richard, 1980 and Golub and Van Loan, 1996), matrix G becomes $$G=USV^H \quad \text{Equation 5:}$$

where U is a matrix of eigenvectors that span the data space, V is a matrix of eigenvectors that span the model space, S is a diagonal eigenvalue matrix whose diagonal elements are called singular values, and H is a conjugate transpose operator.

The generalized least-squares solution of E is $$E=G^{-1}D=VS^{-1}U^H D \quad \text{Equation 6:}$$

In addition, the condition number of the matrix is the largest eigenvalue/smallest eigenvalue; data resolution matrix, $U U^H$; model resolution matrix, $V V^H$. Condition number and eigenvalue analysis provide the uniqueness of the vibrator-sweep matrix.

There are numerous ways to design the vibrator-sweep matrix. Two of the phase-encoding schemes are used here as illustrated examples. The first phase-encoding scheme method constructs the g matrix such that the matrix element of gij is equal gji. This results in a symmetric encoding scheme. The second phase-encoding scheme method constructs the g matrix such that matrix elements of a new row are one-step shifted version of previous row, the matrix element that is shifted outside the matrix boundary of the previous row becomes the first element of the new row, and repeats to procedure at each sweep to complete the vibrator-sweep matrix. This results in a non-symmetric encoding scheme.

A Monte Carlo simulation is used to search randomly for the best phase-encoding scheme for each case. The typical number of trials is 20,000. The criteria to select the optimal phase-encoding scheme are: lowest matrix condition number, distinctive singular values, and minimum separation between singular values. Both methods produce approximately the same inversion result, and either the first and second method can be deployed in the field operation.

The presently described schemes are expected to allow for the collection of quality data for an optimal seismic survey with maximal separation of vibratory signal. In systems with many vibratory sources, an alternative design was also found. While other encoding schemes are possible, the schemes listed here will provide the best separation for ZenSeis® systems with two to eight vibratory sources.

For systems with 4-8 vibrators, we found two schemes that provide the same condition number in the matrix with one scheme being symmetric and the other scheme being non-symmetric. Despite the difference in symmetries, the inversion results are approximately the same, producing optimal source separations of seismic records. Thus, although the schemes have different phase shifts, they provide the same condition number and separation of the eigenvalues for the matrix G. Both embodiments of the schemes for 4 to 8 vibrator systems provide for the same quality of data.

The encoding schemes in FIG. 3-9, including an alternate for systems having 4 to 8 vibratory sources, are the optimal schemes with the lowest matrix condition number, distinctive singular values, and/or minimum separation between singular values. Use of these schemes will give the best separation of eigenvalues in the G matrix during the inversion step of the data analysis. It should be noted that the instant schemes are suitable for use with pilot signals, sweep signals, or other theoretical or recorded representation of the vibrator signal. As a consequence, when these terms are used in the claims that follow, each should be broadly interpreted to include the other as well as other/similar traces representative of the actual or intended vibrator signal pattern.

If one encounters a noisy area where the default number of sweeps and the alternative are still not enough to establish useable signal to noise ratio data, then the optimal phase pattern can be repeated as often as desired to achieve sufficient signal to noise ratio data. Remember the basic rule is the number of sweeps have to be equal or greater to the number of active vibes. Operationally though, it may make more sense to increase sweep duration over more sweeps to minimize additional listen times per sweeps.

Figure 2:
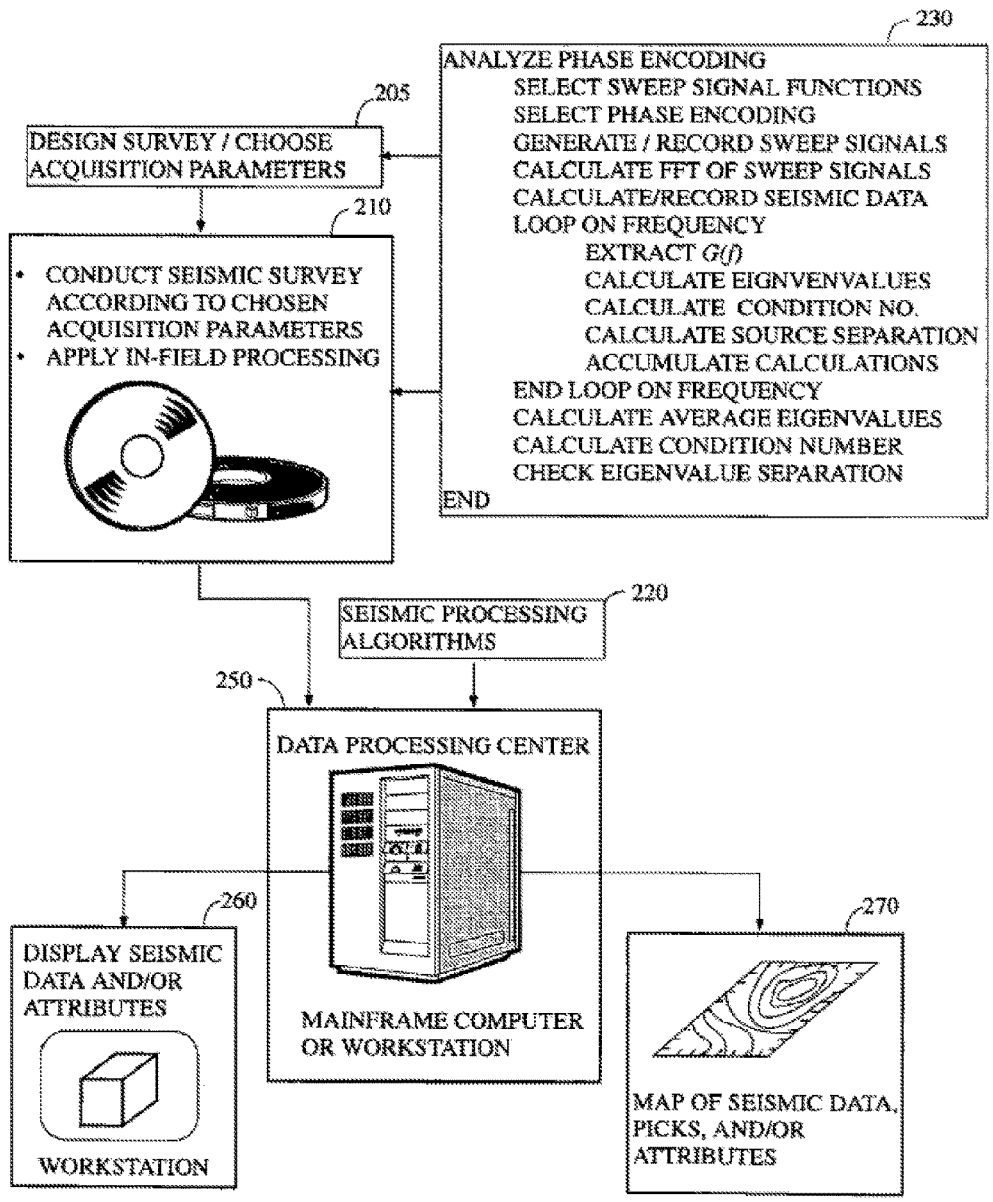
FIG. 2. Flowchart illustrating steps taking in U.S. Pat. No. 7,295,490 (Prior Art).

The following, in conjunction with FIG. 2, describes how the present encoding schemes will be implemented in practice.

First, some basic parameters related to the vibratory survey will preferably be selected (step 110) including, for example, the number of vibrators, number of sweeps, etc. Additionally, it is conventional at this point to select other survey related parameters such as the number of recording traces, the near trace offset, the far trace offset, receiver tracing, the shot (e.g., vibrator position) spacing, etc. The selection of such parameters is well within the capability of one of ordinary skill in the art and will not be discussed further herein.

Once the number of vibrators and number of sweeps is selected, the corresponding phase encoding scheme having the same number of vibrators and sweeps can be selected and implemented in the data acquisition or generation. Note, the schemes in FIGS. 3-9 give the relative phase angle for each vibrator during a sweep. It is preferred that during each sweep, all the vibrators are operated simultaneously. However, this is not mandatory nor do the vibrators have to be operated in numerical order.

Next, the data traces $d_i(t)$ will preferably be generated or recorded using the sweep signals and phase encoding specified previously (step 230). That is, the vibrators will be swept according to the proposed phase encoding scheme and the resulting data will be recorded for subsequent analysis (data inversion and separation to shot records). The step of finding the best phase encoding scheme is no longer needed because the optimal encoding used herein will provide the maximal separation of signal during the data inversion steps. While other phase encoding scheme will work, those disclosed herein are the optimal schemes for an arrangement of vibratory sources.

The instant method of use enters a loop over the designated frequency range (steps 230). Within this loop, the matrix G(f) will preferably be extracted at the appropriate frequency and its eigenvalues determined. The calculated values will then preferably be accumulated and another frequency processed if the current frequency is not the last one.

As an optional step, the recorded seismic data (or generated data if synthetic are being used) will be subjected to a mathematical process designed to recover the unique contribution of each vibrator from the signal $d_i(t)$. This step is commonly referred to in the art as "source separation". Means for doing this are well known and, thus, need not be discussed here. That being said, it should be noted that the instant inventors have determined that better source separation results when the phase encoding scheme is selected according to the methods discussed herein than would otherwise be expected.

The collected data can then be stored and processed as needed in step 250.

By removing the phase encoding selection step and the data/survey comparison step, the present schemes and methods are expected to reduce the time needed to generate an optimal seismic survey.

The present encoding schemes and methods of use are exemplified with respect to the tests described below. However, this is exemplary only, and the invention can be broadly applied to other HFVS systems having 2-8 vibratory sources. The following examples are intended to be illustrative only, and not unduly limit the scope of the appended claims.

The following references are incorporated by reference in their entirety.
U.S. Pat. No. 7,295,490
U.S. Pat. No. 7,515,505
U.S. Pat. No. 7,864,630
U.S. Pat. No. 8,467,267
US20110128818

CHIU, Stephen K., EICK, Peter, P., and EMMONS, Charles W., "High Fidelity Vibratory Seismic (HFVS): Optimal Phase Encoding Selection", SEG/Houston 2005 Annual Meeting, p. 37-39.

The invention claimed is:
1. A method for optimal phase encoding for a simultaneous multi-sourcing method, comprising:
generating, via two to eight vibratory sources, a plurality of seismic signals, wherein the plurality of seismic signals utilizes one or more optimal phase encoding schemes of

| sweep | vib1 | vib2 |
|---|---|---|
| 1 | 100 | 3 |
| 2 | 3 | 100; |

| sweep | vib1 | vib2 | vib3 |
|---|---|---|---|
| 1 | 148 | 194 | 29 |
| 2 | 194 | 148 | 194 |
| 3 | 29 | 194 | 148; |

| sweep | vib1 | vib2 | vib3 | vib4 |
|---|---|---|---|---|
| 1 | 180 | 81 | 60 | 353 |
| 2 | 81 | 180 | 353 | 60 |
| 3 | 60 | 353 | 180 | 81 |
| 4 | 353 | 60 | 81 | 180; |

| sweep | vib1 | vib2 | vib3 | vib4 |
|---|---|---|---|---|
| 1 | 137 | 294 | 238 | 245 |
| 2 | 347 | 9 | 65 | 252 |
| 3 | 274 | 200 | 295 | 27 |
| 4 | 38 | 144 | 239 | 151 |
| 5 | 356 | 290 | 103 | 17 |
| 6 | 232 | 346 | 159 | 253; |

| sweep | vib1 | vib2 | vib3 | vib4 | vib5 |
|---|---|---|---|---|---|
| 1 | 204 | 301 | 319 | 55 | 38 |
| 2 | 301 | 204 | 38 | 319 | 55 |
| 3 | 319 | 38 | 204 | 38 | 319 |
| 4 | 55 | 319 | 38 | 204 | 301 |
| 5 | 38 | 55 | 319 | 301 | 204; |

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |
| 3 | 304 | 194 | 277 | 343 | 27 |
| 4 | 27 | 304 | 194 | 277 | 343 |
| 5 | 343 | 27 | 304 | 194 | 277; |

| sweep | vib1 | vib2 | vib3 | vib4 | vib5 | vib6 |
|---|---|---|---|---|---|---|
| 1 | 16 | 53 | 266 | 94 | 285 | 321 |
| 2 | 53 | 16 | 321 | 266 | 94 | 285 |
| 3 | 266 | 321 | 16 | 285 | 266 | 94 |
| 4 | 94 | 266 | 285 | 16 | 321 | 266 |
| 5 | 285 | 94 | 266 | 321 | 16 | 53 |
| 6 | 321 | 285 | 94 | 266 | 53 | 16; |

| sweep | vib1 | vib2 | vib3 | vib4 | vib5 | vib6 |
|---|---|---|---|---|---|---|
| 1 | 352 | 277 | 322 | 155 | 61 | 302 |
| 2 | 302 | 352 | 277 | 322 | 155 | 61 |
| 3 | 61 | 302 | 352 | 277 | 322 | 155 |
| 4 | 155 | 61 | 302 | 352 | 277 | 322 |
| 5 | 322 | 155 | 61 | 302 | 352 | 277 |
| 6 | 277 | 322 | 155 | 61 | 302 | 352; |

| sweep | vib1 | vib2 | vib3 | vib4 | vib5 | vib6 | vib7 |
|---|---|---|---|---|---|---|---|
| 1 | 85 | 210 | 138 | 162 | 309 | 287 | 176 |
| 2 | 210 | 85 | 176 | 138 | 162 | 309 | 287 |
| 3 | 138 | 176 | 85 | 287 | 309 | 162 | 309 |

-continued

| sweep | vib1 | vib2 | vib3 | vib4 | vib5 | vib6 | vib7 |
|---|---|---|---|---|---|---|---|
| 4 | 162 | 138 | 287 | 85 | 287 | 138 | 162 |
| 5 | 309 | 162 | 309 | 287 | 85 | 176 | 138 |
| 6 | 287 | 309 | 162 | 138 | 176 | 85 | 210 |
| 7 | 176 | 287 | 309 | 162 | 138 | 210 | 85; |

| sweep | vib1 | vib2 | vib3 | vib4 | vib5 | vib6 | vib7 |
|---|---|---|---|---|---|---|---|
| 1 | 159 | 45 | 196 | 225 | 309 | 249 | 80 |
| 2 | 80 | 159 | 45 | 196 | 225 | 309 | 249 |
| 3 | 249 | 80 | 159 | 45 | 196 | 225 | 309 |
| 4 | 309 | 249 | 80 | 159 | 45 | 196 | 225 |
| 5 | 225 | 309 | 249 | 80 | 159 | 45 | 196 |
| 6 | 196 | 225 | 309 | 249 | 80 | 159 | 45 |
| 7 | 45 | 196 | 225 | 309 | 249 | 80 | 159; |

| sweep | vib1 | vib2 | vib3 | vib4 | vib5 | vib6 | vib7 | vib8 |
|---|---|---|---|---|---|---|---|---|
| 1 | 331 | 327 | 101 | 55 | 207 | 67 | 259 | 3 |
| 2 | 327 | 331 | 3 | 101 | 55 | 207 | 67 | 259 |
| 3 | 101 | 3 | 331 | 259 | 67 | 55 | 207 | 67 |
| 4 | 55 | 101 | 259 | 331 | 259 | 101 | 55 | 207 |
| 5 | 207 | 55 | 67 | 259 | 331 | 3 | 3 | 55 |
| 6 | 67 | 207 | 55 | 101 | 3 | 331 | 327 | 101 |
| 7 | 259 | 67 | 207 | 55 | 3 | 327 | 331 | 327 |
| 8 | 3 | 259 | 67 | 207 | 55 | 101 | 327 | 331; |

| sweep | vib1 | vib2 | vib3 | vib4 | vib5 | vib6 | vib7 | vib8 |
|---|---|---|---|---|---|---|---|---|
| 1 | 298 | 122 | 193 | 138 | 247 | 180 | 93 | 78 |
| 2 | 78 | 298 | 122 | 193 | 138 | 247 | 180 | 93 |
| 3 | 93 | 78 | 298 | 122 | 193 | 138 | 247 | 180 |
| 4 | 180 | 93 | 78 | 298 | 122 | 193 | 138 | 247 |
| 5 | 247 | 180 | 93 | 78 | 298 | 122 | 193 | 138 |
| 6 | 138 | 247 | 180 | 93 | 78 | 298 | 122 | 193 |
| 7 | 193 | 138 | 247 | 180 | 93 | 78 | 298 | 122 |
| 8 | 122 | 193 | 138 | 247 | 180 | 93 | 78 | 298; | wherein the two to eight vibratory sources are positioned proximate to a predetermined location on a surface of earth.

2. A method for optimal phase encoding for a simultaneous multi-source method comprising:

generating, via two to eight vibratory sources, a plurality of seismic signals that utilizes one or more encoding schemes of

| sweep | vib1 | vib2 |
|---|---|---|
| 1 | 100 | 3 |
| 2 | 3 | 100; |

| sweep | vib1 | vib2 | vib3 |
|---|---|---|---|
| 1 | 148 | 194 | 29 |
| 2 | 194 | 148 | 194 |
| 3 | 29 | 194 | 148; |

| sweep | vib1 | vib2 | vib3 | vib4 |
|---|---|---|---|---|
| 1 | 180 | 81 | 60 | 353 |
| 2 | 81 | 180 | 353 | 60 |
| 3 | 60 | 353 | 180 | 81 |
| 4 | 353 | 60 | 81 | 180; |

| sweep | vib1 | vib2 | vib3 | vib4 |
|---|---|---|---|---|
| 1 | 137 | 294 | 238 | 245 |
| 2 | 347 | 9 | 65 | 252 |
| 3 | 274 | 200 | 295 | 27 |
| 4 | 38 | 144 | 239 | 151 |
| 5 | 356 | 290 | 103 | 17 |
| 6 | 232 | 346 | 159 | 253; |

| sweep | vib1 | vib2 | vib3 | vib4 | vib5 |
|---|---|---|---|---|---|
| 1 | 204 | 301 | 319 | 55 | 38 |
| 2 | 301 | 204 | 38 | 319 | 55 |
| 3 | 319 | 38 | 204 | 38 | 319 |
| 4 | 55 | 319 | 38 | 204 | 301 |
| 5 | 38 | 55 | 319 | 301 | 204; |

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |
| 3 | 304 | 194 | 277 | 343 | 27 |
| 4 | 27 | 304 | 194 | 277 | 343 |
| 5 | 343 | 27 | 304 | 194 | 277; |

| sweep | vib1 | vib2 | vib3 | vib4 | vib5 | vib6 |
|---|---|---|---|---|---|---|
| 1 | 16 | 53 | 266 | 94 | 285 | 321 |
| 2 | 53 | 16 | 321 | 266 | 94 | 285 |
| 3 | 266 | 321 | 16 | 285 | 266 | 94 |
| 4 | 94 | 266 | 285 | 16 | 321 | 266 |
| 5 | 285 | 94 | 266 | 321 | 16 | 53 |
| 6 | 321 | 285 | 94 | 266 | 53 | 16; |

| sweep | vib1 | vib2 | vib3 | vib4 | vib5 | vib6 |
|---|---|---|---|---|---|---|
| 1 | 352 | 277 | 322 | 155 | 61 | 302 |
| 2 | 302 | 352 | 277 | 322 | 155 | 61 |
| 3 | 61 | 302 | 352 | 277 | 322 | 155 |
| 4 | 155 | 61 | 302 | 352 | 277 | 322 |
| 5 | 322 | 155 | 61 | 302 | 352 | 277 |
| 6 | 277 | 322 | 155 | 61 | 302 | 352; |

| sweep | vib1 | vib2 | vib3 | vib4 | vib5 | vib6 | vib7 |
|---|---|---|---|---|---|---|---|
| 1 | 85 | 210 | 138 | 162 | 309 | 287 | 176 |
| 2 | 210 | 85 | 176 | 138 | 162 | 309 | 287 |
| 3 | 138 | 176 | 85 | 287 | 309 | 162 | 309 |
| 4 | 162 | 138 | 287 | 85 | 287 | 138 | 162 |
| 5 | 309 | 162 | 309 | 287 | 85 | 176 | 138 |
| 6 | 287 | 309 | 162 | 138 | 176 | 85 | 210 |
| 7 | 176 | 287 | 309 | 162 | 138 | 210 | 85; |

| sweep | vib1 | vib2 | vib3 | vib4 | vib5 | vib6 | vib7 |
|---|---|---|---|---|---|---|---|
| 1 | 159 | 45 | 196 | 225 | 309 | 249 | 80 |
| 2 | 80 | 159 | 45 | 196 | 225 | 309 | 249 |
| 3 | 249 | 80 | 159 | 45 | 196 | 225 | 309 |
| 4 | 309 | 249 | 80 | 159 | 45 | 196 | 225 |
| 5 | 225 | 309 | 249 | 80 | 159 | 45 | 196 |
| 6 | 196 | 225 | 309 | 249 | 80 | 159 | 45 |
| 7 | 45 | 196 | 225 | 309 | 249 | 80 | 159; |

| sweep | vib1 | vib2 | vib3 | vib4 | vib5 | vib6 | vib7 | vib8 |
|---|---|---|---|---|---|---|---|---|
| 1 | 331 | 327 | 101 | 55 | 207 | 67 | 259 | 3 |
| 2 | 327 | 331 | 3 | 101 | 55 | 207 | 67 | 259 |
| 3 | 101 | 3 | 331 | 259 | 67 | 55 | 207 | 67 |
| 4 | 55 | 101 | 259 | 331 | 259 | 101 | 55 | 207 |
| 5 | 207 | 55 | 67 | 259 | 331 | 3 | 3 | 55 |
| 6 | 67 | 207 | 55 | 101 | 3 | 331 | 327 | 101 |
| 7 | 259 | 67 | 207 | 55 | 3 | 327 | 331 | 327 |
| 8 | 3 | 259 | 67 | 207 | 55 | 101 | 327 | 331; |

| sweep | vib1 | vib2 | vib3 | vib4 | vib5 | vib6 | vib7 | vib8 |
|---|---|---|---|---|---|---|---|---|
| 1 | 298 | 122 | 193 | 138 | 247 | 180 | 93 | 78 |
| 2 | 78 | 298 | 122 | 193 | 138 | 247 | 180 | 93 |
| 3 | 93 | 78 | 298 | 122 | 193 | 138 | 247 | 180 |
| 4 | 180 | 93 | 78 | 298 | 122 | 193 | 138 | 247 |
| 5 | 247 | 180 | 93 | 78 | 298 | 122 | 193 | 138 |
| 6 | 138 | 247 | 180 | 93 | 78 | 298 | 122 | 193 |
| 7 | 193 | 138 | 247 | 180 | 93 | 78 | 298 | 122 |
| 8 | 122 | 193 | 138 | 247 | 180 | 93 | 78 | 298; | wherein the optimal phase encoding scheme has the same number of vibratory sources as the simultaneous multi-source method.

3. A method for optimal phase encoding for a simultaneous multi-source method comprising:

generating, via two to eight vibratory sources, a plurality of seismic signals that incorporates at least one of

| sweep | vib1 | vib2 |
|---|---|---|
| 1 | 100 | 3 |
| 2 | 3 | 100; |

| sweep | vib1 | vib2 | vib3 |
|---|---|---|---|
| 1 | 148 | 194 | 29 |
| 2 | 194 | 148 | 194 |
| 3 | 29 | 194 | 148; |

| sweep | vib1 | vib2 | vib3 | vib4 |
|---|---|---|---|---|
| 1 | 180 | 81 | 60 | 353 |
| 2 | 81 | 180 | 353 | 60 |
| 3 | 60 | 353 | 180 | 81 |
| 4 | 353 | 60 | 81 | 180; |

| sweep | vib1 | vib2 | vib3 | vib4 | vib5 |
|---|---|---|---|---|---|
| 1 | 204 | 301 | 319 | 55 | 38 |
| 2 | 301 | 204 | 38 | 319 | 55 |
| 3 | 319 | 38 | 204 | 38 | 319 |
| 4 | 55 | 319 | 38 | 204 | 301 |
| 5 | 38 | 55 | 319 | 301 | 204; |

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |
| 3 | 304 | 194 | 277 | 343 | 27 |
| 4 | 27 | 304 | 194 | 277 | 343 |
| 5 | 343 | 27 | 104 | 194 | 277; |

| sweep | vib1 | vib2 | vib3 | vib4 | vib5 | vib6 |
|---|---|---|---|---|---|---|
| 1 | 16 | 53 | 266 | 94 | 285 | 321 |
| 2 | 53 | 16 | 321 | 266 | 94 | 285 |
| 3 | 266 | 321 | 16 | 285 | 266 | 94 |
| 4 | 94 | 266 | 285 | 16 | 321 | 266 |
| 5 | 285 | 94 | 266 | 321 | 16 | 53 |
| 6 | 321 | 285 | 94 | 266 | 53 | 16; |

| sweep | vib1 | vib2 | vib3 | vib4 | vib5 | vib6 |
|---|---|---|---|---|---|---|
| 1 | 352 | 277 | 322 | 155 | 61 | 302 |
| 2 | 302 | 352 | 277 | 322 | 155 | 61 |
| 3 | 61 | 302 | 352 | 277 | 322 | 155 |
| 4 | 155 | 61 | 302 | 352 | 277 | 322 |
| 5 | 322 | 155 | 61 | 302 | 352 | 277 |
| 6 | 277 | 322 | 155 | 61 | 302 | 352; |

| sweep | vib1 | vib2 | vib3 | vib4 | vib5 | vib6 | vib7 |
|---|---|---|---|---|---|---|---|
| 1 | 85 | 210 | 138 | 162 | 309 | 287 | 176 |
| 2 | 210 | 85 | 176 | 138 | 162 | 309 | 287 |
| 3 | 138 | 176 | 85 | 287 | 309 | 162 | 309 |
| 4 | 162 | 138 | 287 | 85 | 287 | 138 | 162 |
| 5 | 309 | 162 | 309 | 287 | 85 | 176 | 138 |
| 6 | 287 | 309 | 162 | 138 | 176 | 85 | 210 |
| 7 | 176 | 287 | 309 | 162 | 138 | 210 | 85; |

| sweep | vib1 | vib2 | vib3 | vib4 | vib5 | vib6 | vib7 |
|---|---|---|---|---|---|---|---|
| 1 | 159 | 45 | 196 | 225 | 309 | 249 | 80 |
| 2 | 80 | 159 | 45 | 196 | 225 | 309 | 249 |
| 3 | 249 | 80 | 159 | 45 | 196 | 225 | 309 |
| 4 | 309 | 249 | 80 | 159 | 45 | 196 | 225 |
| 5 | 225 | 309 | 249 | 80 | 159 | 45 | 196 |
| 6 | 196 | 225 | 309 | 249 | 80 | 159 | 45 |
| 7 | 45 | 196 | 225 | 309 | 249 | 80 | 159; |

| sweep | vib1 | vib2 | vib3 | vib4 | vib5 | vib6 | vib7 | vib8 |
|---|---|---|---|---|---|---|---|---|
| 1 | 331 | 327 | 101 | 55 | 207 | 67 | 259 | 3 |
| 2 | 327 | 331 | 3 | 101 | 55 | 207 | 67 | 259 |
| 3 | 101 | 3 | 331 | 259 | 67 | 55 | 207 | 67 |
| 4 | 55 | 101 | 259 | 331 | 259 | 101 | 55 | 207 |
| 5 | 207 | 55 | 67 | 259 | 331 | 3 | 3 | 55 |
| 6 | 67 | 207 | 55 | 101 | 3 | 331 | 327 | 101 |
| 7 | 259 | 67 | 207 | 55 | 3 | 327 | 331 | 327 |
| 8 | 3 | 259 | 67 | 207 | 55 | 101 | 327 | 331; |

| sweep | vib1 | vib2 | vib3 | vib4 | vib5 | vib6 | vib7 | vib8 |
|---|---|---|---|---|---|---|---|---|
| 1 | 298 | 122 | 193 | 138 | 247 | 180 | 93 | 78 |
| 2 | 78 | 298 | 122 | 193 | 138 | 247 | 180 | 93 |
| 3 | 93 | 78 | 298 | 122 | 193 | 138 | 247 | 180 |
| 4 | 180 | 93 | 78 | 298 | 122 | 193 | 138 | 247 |
| 5 | 247 | 180 | 93 | 78 | 298 | 122 | 193 | 138 |
| 6 | 138 | 247 | 180 | 93 | 78 | 298 | 122 | 193 |
| 7 | 193 | 138 | 247 | 180 | 93 | 78 | 298 | 122 |
| 8 | 122 | 193 | 138 | 247 | 180 | 93 | 78 | 298; | wherein the optimal phase encoding scheme has the same number of vibratory sources as the simultaneous multi-source method.

4. A method of acquiring optimal seismic survey data using a simultaneous multi-source survey having two to eight vibratory sources, comprising:
   a) determining a number of vibratory sources in said simultaneous multi-source survey and number of vibration sweeps;
   b) choosing a corresponding phase encoding scheme for said number of vibratory sources and vibration sweeps, wherein the encoding scheme is one of:

| sweep | vib1 | vib2 |
|---|---|---|
| 1 | 100 | 3 |
| 2 | 3 | 100; |

| sweep | vib1 | vib2 | vib3 |
|---|---|---|---|
| 1 | 148 | 194 | 29 |
| 2 | 194 | 148 | 194 |
| 3 | 29 | 194 | 148; |

| sweep | vib1 | vib2 | vib3 | vib4 |
|---|---|---|---|---|
| 1 | 180 | 81 | 60 | 353 |
| 2 | 81 | 180 | 353 | 60 |
| 3 | 60 | 353 | 180 | 81 |
| 4 | 353 | 60 | 81 | 180; |

| sweep | vib1 | vib2 | vib3 | vib4 |
|---|---|---|---|---|
| 1 | 137 | 294 | 238 | 245 |
| 2 | 347 | 9 | 65 | 252 |
| 3 | 274 | 200 | 295 | 27 |
| 4 | 38 | 144 | 239 | 151 |
| 5 | 356 | 290 | 103 | 17 |
| 6 | 232 | 346 | 159 | 253; |

| sweep | vib1 | vib2 | vib3 | vib4 | vib5 |
|---|---|---|---|---|---|
| 1 | 204 | 301 | 319 | 55 | 38 |
| 2 | 301 | 204 | 38 | 319 | 55 |
| 3 | 319 | 38 | 204 | 38 | 319 |
| 4 | 55 | 319 | 38 | 204 | 301 |
| 5 | 38 | 55 | 319 | 301 | 204; |

| sweep | vib1 | vib2 | vib3 | vib4 | vib5 |
|---|---|---|---|---|---|
| 1 | 277 | 343 | 27 | 304 | 194 |
| 2 | 194 | 277 | 343 | 27 | 304 |

-continued

| | | | | | |
|---|---|---|---|---|---|
| 3 | 304 | 194 | 277 | 343 | 27 |
| 4 | 27 | 304 | 194 | 277 | 343 |
| 5 | 343 | 27 | 104 | 194 | 277; |

| sweep | vib1 | vib2 | vib3 | vib4 | vib5 | vib6 |
|---|---|---|---|---|---|---|
| 1 | 16 | 53 | 266 | 94 | 285 | 321 |
| 2 | 53 | 16 | 321 | 266 | 94 | 285 |
| 3 | 266 | 321 | 16 | 285 | 266 | 94 |
| 4 | 94 | 266 | 285 | 16 | 321 | 266 |
| 5 | 285 | 94 | 266 | 321 | 16 | 53 |
| 6 | 321 | 285 | 94 | 266 | 53 | 16; |

| sweep | vib1 | vib2 | vib3 | vib4 | vib5 | vib6 |
|---|---|---|---|---|---|---|
| 1 | 352 | 277 | 322 | 155 | 61 | 302 |
| 2 | 302 | 352 | 277 | 322 | 155 | 61 |
| 3 | 61 | 302 | 352 | 277 | 322 | 155 |
| 4 | 155 | 61 | 302 | 352 | 277 | 322 |
| 5 | 322 | 155 | 61 | 302 | 352 | 277 |
| 6 | 277 | 322 | 155 | 61 | 302 | 352; |

| sweep | vib1 | vib2 | vib3 | vib4 | vib5 | vib6 | vib7 |
|---|---|---|---|---|---|---|---|
| 1 | 85 | 210 | 138 | 162 | 309 | 287 | 176 |
| 2 | 210 | 85 | 176 | 138 | 162 | 309 | 287 |
| 3 | 138 | 176 | 85 | 287 | 309 | 162 | 309 |
| 4 | 162 | 138 | 287 | 85 | 287 | 138 | 162 |
| 5 | 309 | 162 | 309 | 287 | 85 | 176 | 138 |
| 6 | 287 | 309 | 162 | 138 | 176 | 85 | 210 |
| 7 | 176 | 287 | 309 | 162 | 138 | 210 | 85; |

| sweep | vib1 | vib2 | vib3 | vib4 | vib5 | vib6 | vib7 |
|---|---|---|---|---|---|---|---|
| 1 | 159 | 45 | 196 | 225 | 309 | 249 | 80 |
| 2 | 80 | 159 | 45 | 196 | 225 | 309 | 249 |
| 3 | 249 | 80 | 159 | 45 | 196 | 225 | 309 |
| 4 | 309 | 249 | 80 | 159 | 45 | 196 | 225 |
| 5 | 225 | 309 | 249 | 80 | 159 | 45 | 196 |
| 6 | 196 | 225 | 309 | 249 | 80 | 159 | 45 |
| 7 | 45 | 196 | 225 | 309 | 249 | 80 | 159; |

| sweep | vib1 | vib2 | vib3 | vib4 | vib5 | vib6 | vib7 | vib8 |
|---|---|---|---|---|---|---|---|---|
| 1 | 331 | 327 | 101 | 55 | 207 | 67 | 259 | 3 |
| 2 | 327 | 331 | 3 | 101 | 55 | 207 | 67 | 259 |
| 3 | 101 | 3 | 331 | 259 | 67 | 55 | 207 | 67 |
| 4 | 55 | 101 | 259 | 331 | 259 | 101 | 55 | 207 |
| 5 | 207 | 55 | 67 | 259 | 331 | 3 | 3 | 55 |
| 6 | 67 | 207 | 55 | 101 | 3 | 331 | 327 | 101 |
| 7 | 259 | 67 | 207 | 55 | 3 | 327 | 331 | 327 |
| 8 | 3 | 259 | 67 | 207 | 55 | 101 | 327 | 331; |

| sweep | vib1 | vib2 | vib3 | vib4 | vib5 | vib6 | vib7 | vib8 |
|---|---|---|---|---|---|---|---|---|
| 1 | 298 | 122 | 193 | 138 | 247 | 180 | 93 | 78 |
| 2 | 78 | 298 | 122 | 193 | 138 | 247 | 180 | 93 |
| 3 | 93 | 78 | 298 | 122 | 193 | 138 | 247 | 180 |
| 4 | 180 | 93 | 78 | 298 | 122 | 193 | 138 | 247 |
| 5 | 247 | 180 | 93 | 78 | 298 | 122 | 193 | 138 |
| 6 | 138 | 247 | 180 | 93 | 78 | 298 | 122 | 193 |
| 7 | 193 | 138 | 247 | 180 | 93 | 78 | 298 | 122 |
| 8 | 122 | 193 | 138 | 247 | 180 | 93 | 78 | 298; | c) positioning said vibratory sources proximate to a predetermined location on a surface of earth;
d) energizing said vibratory sources according to said phase encoding scheme thereby vibrating the earth to produce a seismic signal;
e) acquiring reflected seismic signal data at one or more receivers; and
f) processing said data to create a seismic survey.

5. The method of claim 4, wherein the number of vibration sweeps is equal to the number of vibratory sources.

6. The method of claim 4, wherein the number of vibration sweeps is greater than the number of vibratory sources.

7. A method of calculating an optimal phase encoding scheme for a simultaneous multi-source method having 2-8 vibratory sources, the method comprising:
a) preselecting a number of sweeps, wherein the number of sweeps is at least equal to a number of vibratory sources;
b) calculating optimal phase shifts using a Monte Carlo simulation to find the lowest matrix condition number, distinctive singular values, and minimum separation between singular values for a given vibrator-sweep matrix;
c) positioning said vibratory sources proximate to a predetermined location on a surface of earth;
d) energizing said vibratory sources according to said phase encoding scheme thereby vibrating the earth to produce a seismic signal;
e) acquiring reflected seismic signal data at one or more receivers; and
f) processing said data to create a seismic survey.

8. A method of acquiring optimal seismic survey data under noisy conditions using a simultaneous multi-source system having 4 vibratory sources comprising:
generating, via four vibratory sources, a plurality of seismic signals that utilizes an encoding scheme of

| sweep | vib1 | vib2 | vib3 | vib4 |
|---|---|---|---|---|
| 1 | 137 | 294 | 238 | 245 |
| 2 | 347 | 9 | 65 | 252 |
| 3 | 274 | 200 | 295 | 27 |
| 4 | 38 | 144 | 239 | 151 |
| 5 | 356 | 290 | 103 | 17 |
| 6 | 232 | 346 | 159 | 253. |

* * * * *